(12) United States Patent
Miyata et al.

(10) Patent No.: US 7,526,955 B2
(45) Date of Patent: May 5, 2009

(54) FLOW METER AND EXHAUST GAS RECIRCULATION SYSTEM USING THE SAME

(75) Inventors: Motoyuki Miyata, Hitachinaka (JP); Noboru Tokuyasu, Hitachinaka (JP); Katsuaki Fukatsu, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/734,455

(22) Filed: Apr. 12, 2007

(65) Prior Publication Data

US 2007/0245822 A1    Oct. 25, 2007

(30) Foreign Application Priority Data

Apr. 13, 2006    (JP) .............................. 2006-110422

(51) Int. Cl.
    *G01F 1/68*    (2006.01)
(52) U.S. Cl. .................................. 73/204.26
(58) Field of Classification Search ............. 73/204.26, 73/204.25, 204.11, 204.16
    See application file for complete search history.

(56) References Cited

U.S. PATENT DOCUMENTS

| | | | |
|---|---|---|---|
| 4,361,597 A | 11/1982 | Arima et al. | |
| 4,513,615 A | 4/1985 | Sato et al. | |
| 4,881,407 A * | 11/1989 | Tashahashi et al. | 73/204.16 |
| 5,020,214 A | 6/1991 | Tsuruoka et al. | |
| 5,300,916 A | 4/1994 | Ishiguro et al. | |
| 5,610,572 A | 3/1997 | Yajima | |
| 5,731,510 A * | 3/1998 | Jones et al. | 73/23.31 |
| 5,965,813 A * | 10/1999 | Wan et al. | 73/204.26 |
| 6,425,287 B1 * | 7/2002 | Tominaga et al. | 73/204.26 |
| 2005/0189343 A1 | 9/2005 | Griffin et al. | |

FOREIGN PATENT DOCUMENTS

| | | |
|---|---|---|
| EP | 1 835 267 A2 | 9/2007 |
| JP | 59-104513 A | 6/1984 |
| JP | 62-265144 A | 11/1987 |
| JP | 2-114126 A | 4/1990 |
| JP | 5-273020 A | 10/1993 |
| JP | 2002-13960 A | 1/2002 |
| JP | 2003-163105 A | 6/2003 |

OTHER PUBLICATIONS

Extended European Search Report dated Jan. 12, 2009 (Nine (9) pages).

* cited by examiner

*Primary Examiner*—Jewel Thompson
(74) *Attorney, Agent, or Firm*—Crowell & Moring LLP (57) ABSTRACT

The objects of the present invention are to provide a high-accuracy EGR sensor, and EGR system which adopts the above sensor to measure EGR rate. The gas flow meter comprises a sensor section for measuring fluid flow rate and controller for controlling signals transmitted into and out of the sensor section, and is controlled at a working temperature of 350 to 700° C., wherein a protective coat formed on the sensor section has resistance to temperature at which deposition of a PM component in exhaust gases can be prevented.

9 Claims, 3 Drawing Sheets

FLOW METER AND EXHAUST GAS RECIRCULATION SYSTEM USING THE SAME

FIELD OF THE INVENTION

The present invention relates to a sensor element for measuring a flow rate, a flow meter using the element, and an exhaust gas recirculation system using the flow meter.

BACKGROUND OF THE INVENTION

It is desirable for a flow meter to work while keeping a specified accuracy of measurement for extended periods, when a gas flow rate is measured for extended periods. However, a flow meter may be difficult to keep accurate measurement for extended periods, when gases to be measured contain various components or substances. Measurement of exhaust gas flow rate is described by taking that for an exhaust gas recirculation system for internal combustion engines as an example.

An exhaust gas recirculation (EGR) system recycles part of exhaust gases discharged from an internal combustion engine, e.g., vehicle engine, back to the intake side, to lower combustion temperature with gas components of low specific heat, e.g., $CO_2$, and thereby to abate NOx emissions in the exhaust gases. In order to abate NOx emissions, it is necessary to accurately control the EGR rate. In a gasoline engine, inaccurately controlled EGR rate will cause troubles, e.g., difficulty in producing a desired torque or in controlling air/fuel ratio at a desired level. In a diesel engine, on the other hand, an excessive EGR rate will increase particulate molecule (PM) in the exhaust gases. Accordingly, high-accuracy EGR rate control is essential to abate NOx emissions while controlling evolution of PM.

A current EGR system, for example, adopts a control procedure which indirectly estimates EGR rate based on intake-side information, e.g., air flow sensor or throttle opening for estimating intake air rate. This procedure, although capable of controlling EGR rate in a steady-state condition, is incapable of accurately controlling the rate in a transitional operating mode. It is therefore desirable to accurately measure EGR rate in consideration of the exhaust gas regulations becoming more and more stringent both at home and abroad. Development of a gas flow meter which directly measures EGR rate is essential for accurately controlling the rate in an operational mode which needs the EGR control.

For air flow sensors which measure intake air flow rate, JP-A-59-104513 (Patent Document 1) discloses a basic structure. JP-A-2002-13960 (Patent Document 2) discloses an exhaust gas flow meter which uses a sensor heated to a temperature higher than gas flow temperature.

JP-A-2-114126 (Patent Document 3) discloses a sensor coated with a $ZrO_2$-containing glass, JP-A-5-273020 (Patent Document 4) discloses a sensor coated with boron nitride as an outermost layer, and JP-A-2003-163105 (Patent Document 5) discloses a sensor coated with a mixture of $TiO_2$ and glass serving as a protective coat.

(Patent Document 1) JP-A-59-104513
(Patent Document 2) JP-A-2002-13960
(Patent Document 3) JP-A-2-114126
(Patent Document 4) JP-A-5-273020
(Patent Document 5) JP-A-2003-163105

BRIEF SUMMARY OF THE INVENTION

It is necessary for a flow meter to measure gas flow rate at a required accuracy for extended periods. In the case of directly measuring EGR rate, for example, the flow meter element should cope with deposition of PM in exhaust gases on the sensor surface, which will deteriorate measurement accuracy. It should be also resistant to high temperature, which can deteriorate its protective coat.

The objects of the present invention are to provide a flow meter sensor element, flow meter using the same element, and exhaust gas recirculation system using the same flow meter for vehicles.

The present invention has following characteristics to achieve the above objects.

The gas flow meter of the present invention is for determining a gas mass flow rate based on a current value passing through a heat resistor element placed in a stream of gases to be measured, wherein the heat resistor element comprises: an electrically insulating substrate; a heating section which is composed of a protective coat composed of a glass and a metallic resistor element formed on the substrate; a lead portion electrically connected to the heating section; and a fixing member which sets the lead in the gas flow stream and electrically connects the lead portion to an external circuit. One of the characteristics of the present invention is working (heating) temperature of the heat resistor element controlled at 350° C. or higher to solve the above problems. Its another characteristic is a protective coat of glass which has a composition containing $SiO_2$ at 10 to 70% (as oxide) and at least oxides selected from the group consisting of $B_2O_3$, $Al_2O_3$, an alkali metal oxide, alkaline earth oxide, $ZrO_2$, ZnO and rare earth oxide at 30% or less ($Al_2O_3$), 50% or less ($B_2O_3$), 40% or less (alkali metal oxide), 40% or less (alkaline earth oxide), 20% or less ($ZrO_2$), 40% or less (ZnO) and 30% or less (rare-earth oxide), all percentages by mass.

Figure 3:
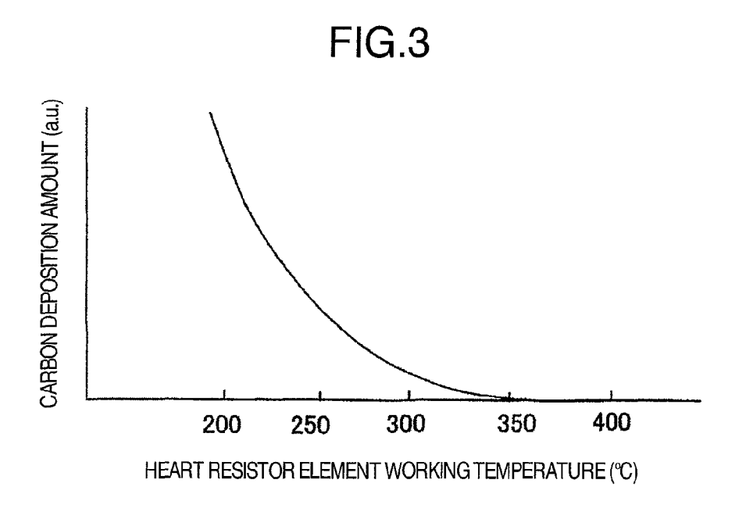
FIG. 3 illustrates a relation between carbon deposition amount (rate) and heat resistor element working (heating) temperature.

As illustrated in FIG. 3, carbon deposition rate decreases as resistor element temperature increases, and essentially no deposition is observed when it is heated to 350° C. or higher. It is therefore necessary to heat the element to 350° C. or higher. It is possible to essentially remove deposits with carbon as a major ingredient when they are heated to 600° C., preferably 700° C. or higher. Working temperature of the heat resistor element is more preferably 350 to 700° C., because heating to a higher temperature, although producing the similar effects, may deteriorate service life and long-term stability of the heat resistor element and flow meter.

Other objects, features and advantages of the invention will become apparent from the following description of the embodiments of the invention taken in conjunction with the accompanying drawings.

DESCRIPTION OF REFERENCE NUMERALS

1, 8 and 9: Element, 2: Lead, 3: Protective coat, 4: Metallic resistor element, 5: Electrically insulating substrate, 6: Jointing material, 7: Gas flow meter, 10: Control circuit, 11: Air flow sensor, 12: Electrically controlled throttle, 13: Internal combustion engine, 14: EGR valve, 15: EGR cooler, 16: Fixing member

DETAILED DESCRIPTION OF THE INVENTION

The gas flow meter of the present invention determines gas mass flow rate based on current passing through a heat resistor element placed in a stream of gases to be measured, comprising the heat resistor element and a controller for controlling evolution of heat. The heat resistor element comprises a heating section and lead electrically connected to the heating section, the former having a structure with an electrically insulating substrate which carries a metallic resistor element coated with glass as a protective coat. The lead is electrically connected to the metallic resistor element at the end by welding or the like. The controller controls metallic resistor element temperature at 350° C. or higher. The gas flow meter is set in the gas flow stream by a fixing member, which may electrically connect the lead to an external circuit, e.g., controller.

The protective coat is prepared to contain $SiO_2$ at 10 to 70% (as oxide), and oxides selected from the group consisting of $B_2O_3$, $Al_2O_3$, an alkali metal oxide, alkaline earth oxide, $ZrO_2$, ZnO and rare earth oxide.

The oxides are preferably incorporated at 30% or less ($Al_2O_3$), 50% or less ($B_2O_3$), 40% or less (alkali metal oxide), 40% or less (alkaline earth oxide), 20% or less ($ZrO_2$), 40% or less (ZnO), and 30% or less (rare-earth oxide), all percentages by mass.

In another embodiment, the protective coat is prepared to contain PbO at 20 to 70% (as oxide), $SiO_2$ at 10 to 40%, and oxides selected from the group consisting of $Al_2O_3$, $B_2O_3$, an alkali metal oxide, alkaline earth oxide, $ZrO_2$, ZnO and rare earth oxide.

The oxides are preferably incorporated at 30% or less ($Al_2O_3$), 20% or less ($B_2O_3$), 20% or less (alkali metal oxide), 20% or less (alkaline earth oxide), 10% or less ($ZrO_2$), 10% or less (ZnO), and 30% or less (rare-earth oxide), all percentages by mass.

The protective coat should have a thermal expansion coefficient which causes no cracking at working temperature. More specifically, it is recommended that the coefficient is in a range of from $50 \times 10^{-7}$ to $80 \times 10^{-7}$/° C.

The exhaust gas recirculation system of the present invention, which recycles part of exhaust gases back to the intake stream, adopts the gas flow meter of the present invention to measure flow rate of the recycled stream.

It is preferable to control flow rate of the recycled stream by a control valve based on the measured flow rate.

When the exhaust gas recirculation system is equipped with a cooler, PM or the like present in the recycled stream may deposit on the cooler to cause clogging and reduced flow rate. Extent of the clogging can be determined by measuring flow rate both in the upstream and downstream of the cooler.

Figure 1:
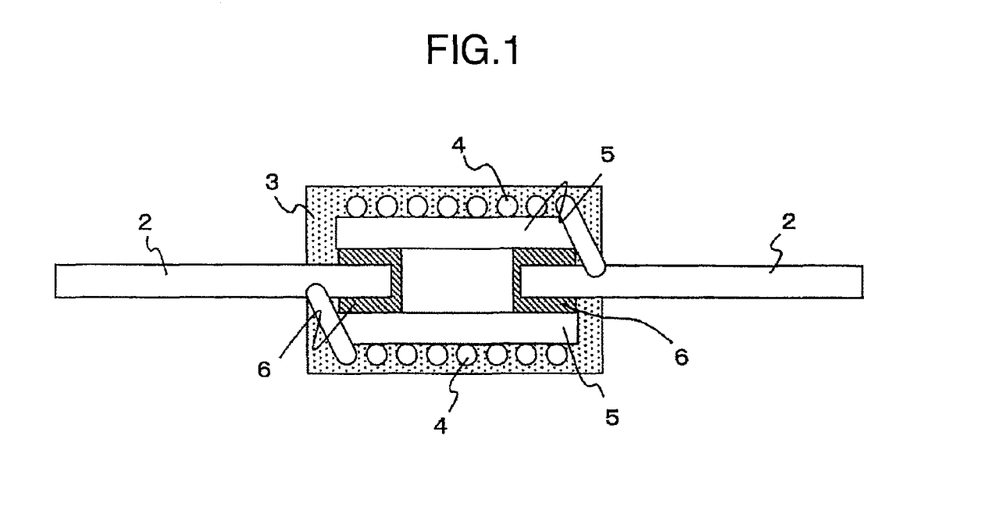
FIG. 1 is a cross-sectional view of the element 1.

FIG. 1 presents a cross-sectional view of a representative element for the present invention, wherein the element 1 comprises a hollow, electrically insulating substrate 5 to which a lead 2 is bonded at each side by a jointing material 6. A metallic resistor element 4 is wound around the electrically insulating substrate 5 to secure a given resistance. The lead 2 is also bonded to the metallic resistor element 4 at each end. The metallic resistor element 4, jointing material 6 and lead 2 are covered by a protective coat 3. It is to be understood that FIG. 1 illustrates one embodiment of the element structure, and the structure is not limited to the one shown in FIG. 1.

Figure 2:
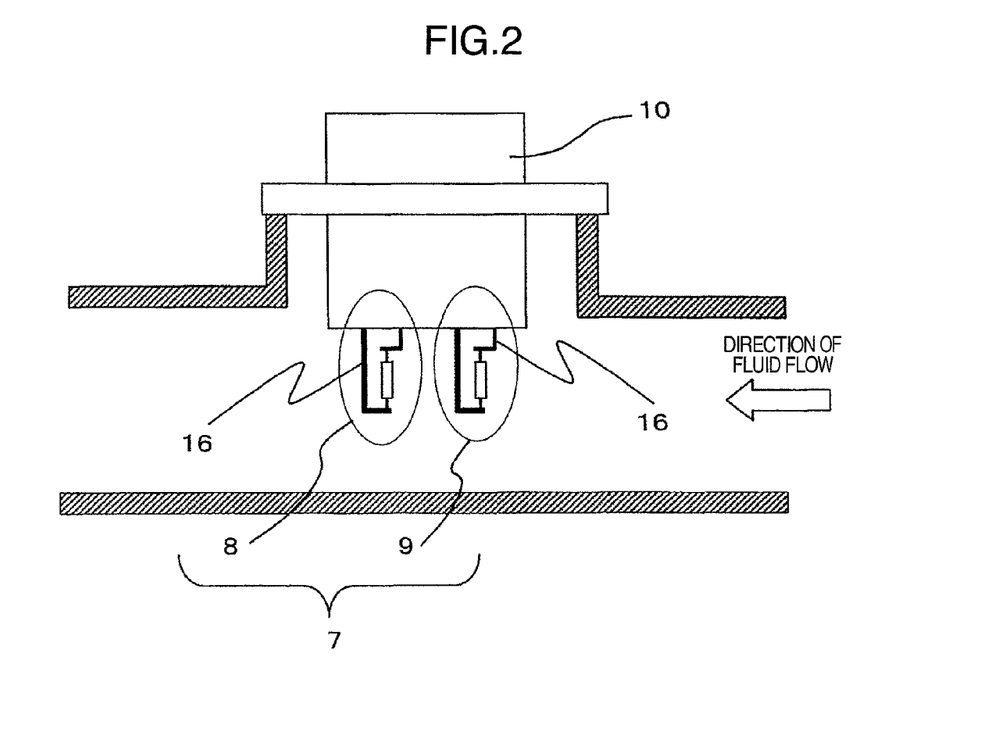
FIG. 2 is a cross-sectional view of the gas flow meter 7.

FIG. 2 illustrates one embodiment of the gas flow meter of the present invention, wherein the gas flow meter 7 adopts a pair of the elements of the structure shown in FIG. 1. The element 9 is responsible for measuring temperature of a gas stream and the element 8 for measuring flow rate, both set in the stream passage. The element 8 is kept heated to maintain a certain temperature difference between these elements, controlled by a control circuit 10. Flow rate is determined based on a heat conducted from the element 8 into the gas stream, the heat being converted into an electrical signal.

FIG. 3 illustrates a relation between rate of carbon deposited on a heat resistor element and element working temperature. As illustrated, carbon deposition rate decreases as resistor element temperature increases, and essentially no deposition is observed when it is heated to 350° C. or higher. Accordingly, the resistor element should be kept at 350° C. or higher.

It is possible to essentially totally remove deposits with carbon as a major ingredient when they are heated to 600° C., preferably 700° C. or higher. Working temperature of the heat resistor element is more preferably 350 to 700° C., because heating to a higher temperature, although producing the similar effects, may deteriorate service life and long-term stability of the heat resistor element and flow meter.

The EGR sensor of the present invention works on the principle similar to that for an air flow sensor, wherein the resistor element is electrically heated to a temperature kept higher than the exhaust gas stream by a certain temperature difference (controlled at a controlled temperature α), and the flow rate is determined from a quantity of power supplied. Temperature of the resistor element is set by exhaust gas temperature and α. For example, it is heated up to 450° C. (=100+350) when a is set at 350° C. and exhaust gas temperature is 100° C., and it is heated up to 650° C. (=300+350) when a is set at 350° C. and exhaust gas temperature is 300° C.

Figure 4:
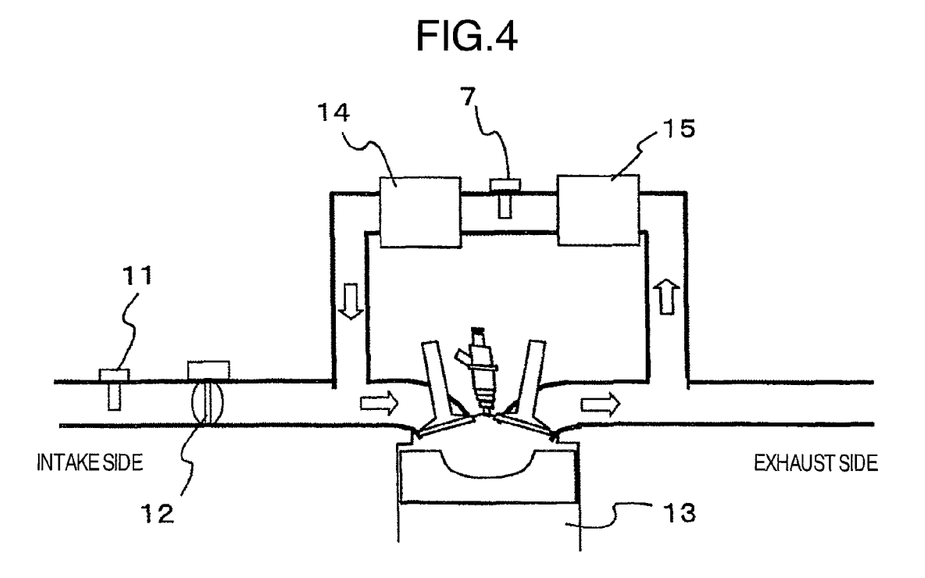
FIG. 4 illustrates a structure of an EGR system.

FIG. 4 illustrates a structure of EGR system which adopts the gas flow meter 7. Part of exhaust gases discharged from an internal combustion engine 13 is recycled back to the intake side of the engine 13, after being cooled by an EGR cooler 15 and flow-controlled by an EGR valve 14 for reuse for combustion. A current EGR system adopts a control procedure which estimates an EGR rate based on intake-side information, e.g., air flow sensor 11 or throttle 12 opening. This procedure, although capable of controlling the EGR rate in a steady-state condition, is incapable of accurately controlling the rate in a transitional operating mode. The EGR rate can be accurately controlled even in a transitional operating mode, when the gas flow meter 7 is provided in the EGR passage to control the EGR valve 14, as illustrated in FIG. 4 or the like.

The gas flow meter is most preferably positioned in the downstream of the EGR cooler (intake side) or upstream of the EGR valve. However, it may be positioned in the upstream of the EGR cooler or downstream of the EGR valve depending on specific purposes. Moreover, a plurality of flow meters may be provided to measure flow rate for each device.

Position of the flow meter should be determined in consideration of heat resistant temperature of meter components. The flow meter with a resin component is preferably positioned downstream of the cooler 15 (intake side) because the component may deteriorate when exposed to high-temperature exhaust gases. It may be positioned at any point in the exhaust side, when it is free of temperature limitation. Moreover, it may be provided in a line branching off from the main exhaust gas passage.

The flow meter of the present invention is more heat-resistant than a conventional one, and, when applied to measurement of flow rate on the intake side, can suppress deposition of contaminants present in the intake-side gases, when heated to a high temperature. Accordingly, it can effectively improve accuracy of measurement on the intake side.

The electrically insulating substrate 5 is preferably made of an insulating inorganic material (e.g., alumina or quartz) or metallic material coated with an insulating inorganic material. It may be cylindrical, flat plate shape or polyhedral. A cylindrical shape is more preferable, because a lead can be bonded thereto after being inserted into each end.

A cylindrical substrate is preferably 0.1 to 1.00 mm in outer diameter and 1.0 to 5.00 mm long, particularly more preferably 0.3 to 0.7 mm in outer diameter and 2.0 to 3.00 mm long.

The lead 2 and metallic resistor element 4 can be made of a noble metal (e.g., platinum, iridium, rhodium, palladium, gold or silver, alloy thereof, or alloy of a noble metal with a base metal (e.g., nickel or cobalt). A base metal may be coated with a noble metal.

The lead 2 may be in the form of a line having a circular, elliptical, flat plate shape or polyhedral cross-section, a circular or elliptic cross-section being more preferable. When the lead 2 is inserted into each end of the electrical insulating substrate 5, it should have an outer diameter smaller than inner diameter of the substrate 5.

The metallic resistor element 4 is formed on the electrically insulating substrate by winding the element 4 of linear shape around the substrate, or in the form of film provided by sputtering, physical vapor deposition (PVD), chemical vapor deposition (CVD) or plating.

It is not necessary for the electrically insulating substrate and metallic resistor element to come into direct contact with each other, and have an intermediate layer for stress relaxation or reaction deceleration in-between. The intermediate layer may not be in the form of film, and a linear material may be formed into the layer in a similar manner.

The metallic resistor element, when it is in the form of a line, is wound around the electrically insulating substrate, its resistance being adjusted at a given level by selecting material, diameter and length. It preferably has a diameter in a range from 0.1 to 100 $\mu$m, more preferably from 10 to 50 $\mu$m, although varying depending on its material, diameter, length and tension created by a load which it receives while being wound.

The metallic resistor element, when it is in the form of a film, is formed into a spiral or meandering shape matching an electrically insulating substrate shape, its resistance being adjustable at a given level by selecting material, formed shape and thickness. It preferably has a thickness in a range from 0.1 to 100 $\mu$m, although varying depending on method by which it is formed, its material and shape.

The jointing material 6 may be made of glass, which may be incorporated with a ceramic material, e.g., alumina or zirconia. The glass, which is optionally incorporated with a ceramic material, is formed into a paste with a solvent, e.g., terpineol, screen oil or butyl carbitol, and spread on the lead and/or electrically insulating substrate and calcined to bond them to each other.

The useful glass compositions include amorphous or crystalline borosilicate, alumina silicate, alumina borosilicate, alkaline, zinc-based, magnesia-based, lead-based and phosphate-based glasses. The useful ceramic materials include alumina and zirconia. Viscosity of the paste can be adjusted with quantity of solvent or binder, e.g., ethyl cellulose.

The element for the present invention is intended for measuring intake or exhaust gas flow rate. When set in an exhaust gas stream, in particular, it may have deteriorated measurement accuracy due to PM present in the exhaust gases deposited thereon. Accordingly, it is electrically heated to 350° C. or higher. A protective coat for a conventional air flow sensor has insufficient resistance to such a high temperature.

For the element to stably measure flow rate at 350° C. or higher, it should be protected by a protective coat of improved heat resistance. When glass is used for the protective coat 3, it should have a glass transition temperature of 400° C. or higher, preferably 450° C. or higher for long-term reliability. At the same time, it should have a thermal expansion coefficient of from $50 \times 10^{-7}$ to $80 \times 10^{-7}$/° C., particularly preferably from $55 \times 10^{-7}$ to $70 \times 10^{-7}$/° C., in consideration of those of the electrically insulating substrate, metallic resistor element and lead.

The protective coat 3 is made of glass, which may be incorporated with a ceramic material or metal to form an inorganic composite, as required. The protective coat can be formed by spreading and calcining the glass composition after it is incorporated with a solvent, e.g., terpineol or butyl carbitol, to form a paste. Viscosity of the paste can be adjusted by changing quantity of solvent or binder, e.g., ethyl cellulose, with which the glass composition is incorporated. The glass composition is preferably crushed to have a diameter of 100 $\mu$m or less before being formed into a paste, more preferably 50 $\mu$m or less. The glass particles having a diameter larger than 100 $\mu$m may not be sufficiently softened at a calcination temperature, to give rough surfaces of the calcined protective coat.

Calcination temperature is preferably set at softening temperature of the jointing material 6 or 1100° C. or less, whichever is lower. The jointing material 6 will be softened when calcination temperature is set at above its softening temperature, with the result that the element cannot retain its shape. Calcination at above 1100° C. accelerates diffusion of the metallic ion in the glass in the jointing material 6 or protective coat 3 into the metallic resistor element 4 to change its temperature coefficient of resistance. Moreover, the lead 2 or metallic resistor element 4 may lose its strength to cause troubles, e.g., disconnection and other damages at above 1100° C.

The protective coat is preferably 0.5 to 1000 $\mu$m thick. It may not sufficiently coat the metallic resistor element when its thickness is less than 0.5 $\mu$m, and may have decreased measurement sensitivity when it is more than 1000 $\mu$m.

Next, the glass composition for the protective coat is described.

(1) PbO-free Glass Composition

The glass composition preferably contains $SiO_2$ at 10 to 70% by mass, more preferably 20 to 40% by mass. At below 10% by mass, it will have a glass transition temperature falling below 450° C. At above 70% by mass, on the other hand, calcination temperature will exceed 1100° C.

$Al_2O_3$ has an effect of increasing glass transition temperature of the composition, and is preferably contained at 30% by mass or less. At above 30% by mass, calcination temperature will exceed 1100° C.

$B_2O_3$ has an effect of decreasing glass viscosity at high temperature, and is preferably contained at 50% by mass or less. At above 50% by mass, the composition will have a glass transition temperature falling below 450° C.

An alkali metal oxide and alkaline earth oxide have an effect of decreasing glass viscosity at high temperature and increasing thermal expansion coefficient, and are preferably contained each at 40% by mass or less. At above 40% by mass, the composition will have a glass transition temperature falling below 450° C.

ZrO2 and ZnO have an effect of increasing environment resistance of the glass composition, and are preferably contained at 20% by mass or less and 40% by mass or less, respectively. At a higher content, thermal expansion coefficient of the composition will fall below $50\times10^{-7}/°$ C.

A rare-earth oxide has an effect of increasing glass transition temperature of the composition, and is preferably contained at 20% by mass or less, more preferably 10% by mass or less. At above 20% by mass, calcination temperature for forming the protective coat will exceed 1100° C.

(2) PbO-containing Glass Composition

The glass composition preferably contains PbO at 20 to 70% by mass, more preferably 45 to 60% by mass. At below 20% by mass, calcination temperature for forming the protective coat will exceed 1100° C. At above 70% by mass, on the other hand, the composition will have a glass transition temperature falling below 450° C.

$SiO_2$ has an effect of increasing glass transition temperature of the composition, and is preferably contained at 10% to 40% by mass, more preferably 20 to 30% by mass. At below 10% by mass, the composition will have a glass transition temperature falling below 450° C. At above 40% by mass, on the other hand, thermal expansion coefficient of the composition will fall below $50\times10^{-7}/°$ C.

$Al_2O_3$ has an effect of increasing glass transition temperature of the composition, and is preferably contained at 30% by mass or less, more preferably 3 to 15% by mass. At above 30% by mass, calcination temperature for forming the protective coat will exceed 1100° C.

$B_2O_3$ has an effect of decreasing glass viscosity at high temperature, and is preferably contained at 20% by mass or less. At above 20% by mass, the composition will have a glass transition temperature falling below 450° C.

An alkali metal oxide and alkaline earth oxide have an effect of decreasing glass viscosity at high temperature and increasing thermal expansion coefficient, and are preferably contained at 20% by mass or less. At above 20% by mass, the composition will have a glass transition temperature falling below 450° C.

$ZrO_2$ and ZnO have an effect of increasing environment resistance of the glass composition, and are preferably contained each at 10% by mass or less. At above 10% by mass, thermal expansion coefficient of the composition will fall below $50\times10^{-7}/°$ C.

A rare-earth oxide has an effect of increasing glass transition temperature of the composition, and is preferably contained at 30% by mass or less, more preferably 20% by mass or less. At above 30% by mass, calcination temperature for forming the protective coat will exceed 1100° C.

EXAMPLES

EMBODIMENT 1

Next, the method for fabrication of the element for the present invention is specifically described.

The glass composition was prepared by the following procedure.

Given quantities of the starting powders were put in a platinum crucible and mixed with each other, and dissolved in an electric oven at a temperature varying in a range from 1000 to 1600° C., depending on the composition. On completion of the dissolution, the glass melt was stirred for about 40 minutes with a stirring blade. It was allowed to stand for 20 minutes after the blade was removed, and poured into a graphite jig for quenching to prepare the glass block (about 100 g). It was reheated and then slowly cooled at 1 to 2° C./minute for removing strains.

The glass block was cut into a test piece, 4 by 4 by 15 mm, for measurement of thermal expansion coefficient and glass transition temperature. The block was also crushed, and the resulting particles were mixed with an organic solvent to prepare the glass paste. The glass paste was spread over the element 1 not coated with a protective coat, and calcined to determine calcination temperature.

Table 1-(1), -(2) and -(3) give Examples for the PbO-free glass compositions. The $SiO_2$ content was varied in Examples 1 to 13, $Al_2O_3$ content was varied in Examples 14 to 20, $B_2O_3$ content was varied in Examples 21 to 27, $K_2O$ content was varied in Examples 28 to 34, BaO content was varied in Examples 35 to 42, $ZrO_2$ content was varied in Examples 43 to 48, ZnO content was varied in Examples 49 to 55, and $Gd_2O_3$ content was varied in Examples 56 to 61.

As shown, the glass composition has a glass transition temperature higher than 450° C., can be calcined at 1100° C. or lower to form the protective coat, and thermal expansion coefficient of $50\times10^{-7}$ to $80\times10^{-7}/°$ C., when it contains $SiO_2$ at 10 to 70%, $Al_2O_3$ at 30% or less, $B_2O_3$ at 50% or less, an alkali metal oxide at 40% or less, alkaline earth metal oxide at 40% or less, $ZrO_2$ at 20% or less, ZnO at 40% or less and rare-earth oxide at 30% or less, all percentages by mass.

TABLE 1-(1)

| | Composition (% by mass) | | | | | | | | | | | Properties | | |
|---|---|---|---|---|---|---|---|---|---|---|---|---|---|---|
| | | | | | | | | | | | | Thermal expansion coefficient | Glass transition temperature | Calcination temperature |
| Examples | $SiO_2$ | $Al_2O_3$ | $B_2O_3$ | $Na_2O$ | $K_2O$ | MgO | BaO | $ZrO_2$ | ZnO | $Gd_2O_3$ | total | (x $10^{-7}/°$ C.) | (° C.) | (° C.) |
| 1 | 5.0 | 15.4 | 47.5 | 4.8 | 0.0 | 8.3 | 19.0 | 0.0 | 0.0 | 0.0 | 100.0 | 70 | 410 | 830 |
| 2 | 10.0 | 14.6 | 45.0 | 4.5 | 0.0 | 7.9 | 18.0 | 0.0 | 0.0 | 0.0 | 100.0 | 68 | 460 | 850 |
| 3 | 15.0 | 13.8 | 42.5 | 4.3 | 0.0 | 7.4 | 17.0 | 0.0 | 0.0 | 0.0 | 100.0 | 66 | 510 | 870 |
| 4 | 20.0 | 13.0 | 40.0 | 4.0 | 0.0 | 7.0 | 16.0 | 0.0 | 0.0 | 0.0 | 100.0 | 64 | 550 | 890 |
| 5 | 25.0 | 12.1 | 37.5 | 3.8 | 0.0 | 6.6 | 15.0 | 0.0 | 0.0 | 0.0 | 100.0 | 63 | 565 | 910 |
| 6 | 30.0 | 11.4 | 35.0 | 3.5 | 0.0 | 6.1 | 14.0 | 0.0 | 0.0 | 0.0 | 100.0 | 62 | 580 | 930 |
| 7 | 40.0 | 9.8 | 30.0 | 3.0 | 0.0 | 5.3 | 12.0 | 0.0 | 0.0 | 0.0 | 100.0 | 60 | 610 | 970 |
| 8 | 50.0 | 8.1 | 25.0 | 2.5 | 0.0 | 4.4 | 10.0 | 0.0 | 0.0 | 0.0 | 100.0 | 58 | 630 | 1010 |
| 9 | 55.0 | 7.3 | 22.5 | 2.3 | 0.0 | 3.9 | 9.0 | 0.0 | 0.0 | 0.0 | 100.0 | 57 | 640 | 1030 |
| 10 | 60.0 | 6.5 | 20.0 | 2.0 | 0.0 | 3.5 | 8.0 | 0.0 | 0.0 | 0.0 | 100.0 | 56 | 650 | 1050 |
| 11 | 65.0 | 5.7 | 17.5 | 1.8 | 0.0 | 3.1 | 7.0 | 0.0 | 0.0 | 0.0 | 100.0 | 55 | 660 | 1070 |
| 12 | 70.0 | 4.9 | 15.0 | 1.5 | 0.0 | 2.6 | 6.0 | 0.0 | 0.0 | 0.0 | 100.0 | 54 | 670 | 1090 |

TABLE 1-(1)-continued

| | Composition (% by mass) | | | | | | | | | | | Properties | | |
|---|---|---|---|---|---|---|---|---|---|---|---|---|---|---|
| Examples | $SiO_2$ | $Al_2O_3$ | $B_2O_3$ | $Na_2O$ | $K_2O$ | MgO | BaO | $ZrO_2$ | ZnO | $Gd_2O_3$ | total | Thermal expansion coefficient ($\times 10^{-7}/°C.$) | Glass transition temperature (° C.) | Calcination temperature (° C.) |
| 13 | 75.0 | 4.1 | 12.5 | 1.3 | 0.0 | 2.2 | 5.0 | 0.0 | 0.0 | 0.0 | 100.0 | 53 | 680 | 1110 |
| 14 | 23.5 | 0.0 | 44.7 | 5.9 | 0.0 | 5.9 | 11.8 | 0.0 | 0.0 | 8.2 | 100.0 | 65 | 450 | 735 |
| 15 | 21.2 | 10.0 | 40.2 | 5.3 | 0.0 | 5.3 | 10.6 | 0.0 | 0.0 | 7.4 | 100.0 | 63 | 500 | 795 |
| 16 | 20.0 | 15.0 | 38.0 | 5.0 | 0.0 | 5.0 | 10.0 | 0.0 | 0.0 | 7.0 | 100.0 | 62 | 560 | 830 |
| 17 | 18.8 | 20.0 | 35.8 | 4.7 | 0.0 | 4.7 | 9.4 | 0.0 | 0.0 | 6.6 | 100.0 | 61 | 585 | 880 |
| 18 | 16.5 | 30.0 | 31.3 | 4.1 | 0.0 | 4.1 | 8.2 | 0.0 | 0.0 | 5.8 | 100.0 | 59 | 635 | 980 |
| 19 | 15.3 | 35.0 | 29.1 | 3.8 | 0.0 | 3.8 | 7.6 | 0.0 | 0.0 | 5.4 | 100.0 | 58 | 660 | 1030 |
| 20 | 14.1 | 40.0 | 26.8 | 3.5 | 0.0 | 3.5 | 7.1 | 0.0 | 0.0 | 4.9 | 100.0 | 57 | 685 | 1080 |
| 21 | 38.3 | 21.7 | 0.0 | 8.3 | 0.0 | 8.3 | 3.3 | 0.0 | 6.7 | 13.3 | 100.0 | 64 | 640 | 970 |
| 22 | 34.5 | 19.5 | 10.0 | 7.5 | 0.0 | 7.5 | 3.0 | 0.0 | 6.0 | 12.0 | 100.0 | 63 | 620 | 940 |

TABLE 1-(2)

| | Composition (% by mass) | | | | | | | | | | | Properties | | |
|---|---|---|---|---|---|---|---|---|---|---|---|---|---|---|
| Examples | $SiO_2$ | $Al_2O_3$ | $B_2O_3$ | $Na_2O$ | $K_2O$ | MgO | BaO | $ZrO_2$ | ZnO | $Gd_2O_3$ | total | Thermal expansion coefficient ($\times 10^{-7}/°C.$) | Glass transition temperature (° C.) | Calcination temperature (° C.) |
| 23 | 30.7 | 17.3 | 20.0 | 6.7 | 0.0 | 6.7 | 2.7 | 0.0 | 5.3 | 10.7 | 100.0 | 62 | 590 | 910 |
| 24 | 26.8 | 15.2 | 30.0 | 5.8 | 0.0 | 5.8 | 2.3 | 0.0 | 4.7 | 9.3 | 100.0 | 61 | 550 | 880 |
| 25 | 23.0 | 13.0 | 40.0 | 5.0 | 0.0 | 5.0 | 2.0 | 0.0 | 4.0 | 8.0 | 100.0 | 60 | 510 | 850 |
| 26 | 19.2 | 10.8 | 50.0 | 4.2 | 0.0 | 4.2 | 1.7 | 0.0 | 3.3 | 6.7 | 100.0 | 59 | 460 | 820 |
| 27 | 17.3 | 9.8 | 55.0 | 3.8 | 0.0 | 3.8 | 1.5 | 0.0 | 3.0 | 6.0 | 100.0 | 58.5 | 435 | 805 |
| 28 | 22.2 | 16.7 | 38.9 | 0.0 | 0.0 | 7.8 | 16.7 | 0.0 | 0.0 | 3.3 | 105.6 | 62 | 575 | 880 |
| 29 | 20.0 | 15.0 | 35.0 | 0.0 | 10.0 | 7.0 | 15.0 | 0.0 | 0.0 | 3.0 | 105.0 | 64 | 535 | 860 |
| 30 | 17.8 | 13.3 | 31.1 | 0.0 | 20.0 | 6.2 | 13.3 | 0.0 | 0.0 | 2.7 | 104.4 | 66 | 505 | 840 |
| 31 | 15.6 | 11.7 | 27.2 | 0.0 | 30.0 | 5.4 | 11.7 | 0.0 | 0.0 | 2.3 | 103.9 | 68 | 475 | 820 |
| 32 | 13.3 | 10.0 | 23.3 | 0.0 | 40.0 | 4.7 | 10.0 | 0.0 | 0.0 | 2.0 | 103.3 | 70 | 455 | 800 |
| 33 | 12.2 | 9.2 | 21.4 | 0.0 | 45.0 | 4.3 | 9.2 | 0.0 | 0.0 | 1.8 | 103.1 | 71 | 445 | 790 |
| 34 | 11.1 | 8.3 | 19.4 | 0.0 | 50.0 | 3.9 | 8.3 | 0.0 | 0.0 | 1.7 | 102.8 | 72 | 435 | 780 |
| 35 | 29.4 | 11.8 | 41.2 | 5.9 | 0.0 | 0.0 | 0.0 | 0.0 | 0.0 | 11.8 | 100.0 | 59 | 595 | 880 |
| 36 | 26.5 | 10.6 | 37.1 | 5.3 | 0.0 | 0.0 | 10.0 | 0.0 | 0.0 | 10.6 | 100.0 | 61 | 555 | 860 |
| 37 | 25.0 | 10.0 | 35.0 | 5.0 | 0.0 | 0.0 | 15.0 | 0.0 | 0.0 | 10.0 | 100.0 | 62 | 535 | 850 |
| 38 | 23.5 | 9.4 | 32.9 | 4.7 | 0.0 | 0.0 | 20.0 | 0.0 | 0.0 | 9.4 | 100.0 | 63 | 520 | 840 |
| 39 | 20.6 | 8.2 | 28.8 | 4.1 | 0.0 | 0.0 | 30.0 | 0.0 | 0.0 | 8.2 | 100.0 | 65 | 490 | 820 |
| 40 | 17.6 | 7.1 | 24.7 | 3.5 | 0.0 | 0.0 | 40.0 | 0.0 | 0.0 | 7.1 | 100.0 | 67 | 460 | 800 |
| 41 | 16.2 | 6.5 | 22.6 | 3.2 | 0.0 | 0.0 | 45.0 | 0.0 | 0.0 | 6.5 | 100.0 | 68 | 445 | 790 |
| 42 | 14.7 | 5.9 | 20.6 | 2.9 | 0.0 | 0.0 | 50.0 | 0.0 | 0.0 | 5.9 | 100.0 | 69 | 430 | 780 |

TABLE 1-(3)

| | Composition (% by mass) | | | | | | | | | | | Properties | | |
|---|---|---|---|---|---|---|---|---|---|---|---|---|---|---|
| Examples | $SiO_2$ | $Al_2O_3$ | $B_2O_3$ | $Na_2O$ | $K_2O$ | MgO | BaO | $ZrO_2$ | ZnO | $Gd_2O_3$ | total | Thermal expansion coefficient ($\times 10^{-7}/°C.$) | Glass transition temperature (° C.) | Calcination temperature (° C.) |
| 43 | 31.0 | 12.0 | 27.0 | 9.0 | 0.0 | 0.0 | 7.0 | 0.0 | 11.0 | 3.0 | 100.0 | 70 | 500 | 800 |
| 44 | 29.5 | 11.4 | 25.7 | 8.6 | 0.0 | 0.0 | 6.7 | 5.0 | 10.5 | 2.9 | 100.0 | 65 | 510 | 810 |
| 45 | 27.9 | 10.8 | 24.3 | 8.1 | 0.0 | 0.0 | 6.3 | 10.0 | 9.9 | 2.7 | 100.0 | 60 | 520 | 820 |
| 46 | 24.8 | 9.6 | 21.6 | 7.2 | 0.0 | 0.0 | 5.6 | 20.0 | 8.8 | 2.4 | 100.0 | 50 | 540 | 840 |
| 47 | 23.3 | 9.0 | 20.3 | 6.8 | 0.0 | 0.0 | 5.3 | 25.0 | 8.3 | 2.3 | 100.0 | 45 | 550 | 850 |
| 48 | 21.7 | 8.4 | 18.9 | 6.3 | 0.0 | 0.0 | 4.9 | 30.0 | 7.7 | 2.1 | 100.0 | 40 | 560 | 860 |
| 49 | 37.5 | 12.5 | 31.3 | 12.5 | 0.0 | 0.0 | 0.0 | 0.0 | 0.0 | 6.3 | 100.0 | 90 | 570 | 885 |
| 50 | 33.8 | 11.3 | 28.1 | 11.3 | 0.0 | 0.0 | 0.0 | 0.0 | 10.0 | 5.6 | 100.0 | 80 | 540 | 865 |
| 51 | 30.0 | 10.0 | 25.0 | 10.0 | 0.0 | 0.0 | 0.0 | 0.0 | 20.0 | 5.0 | 100.0 | 65 | 510 | 845 |
| 52 | 26.3 | 8.8 | 21.9 | 8.8 | 0.0 | 0.0 | 0.0 | 0.0 | 30.0 | 4.4 | 100.0 | 60 | 480 | 825 |
| 53 | 24.4 | 8.1 | 20.3 | 8.1 | 0.0 | 0.0 | 0.0 | 0.0 | 35.0 | 4.1 | 100.0 | 55 | 465 | 815 |
| 54 | 22.5 | 7.5 | 18.8 | 7.5 | 0.0 | 0.0 | 0.0 | 0.0 | 40.0 | 3.8 | 100.0 | 50 | 450 | 805 |
| 55 | 20.6 | 6.9 | 17.2 | 6.9 | 0.0 | 0.0 | 0.0 | 0.0 | 45.0 | 3.4 | 100.0 | 48 | 435 | 795 |
| 56 | 35.0 | 12.0 | 27.0 | 5.0 | 0.0 | 0.0 | 15.0 | 0.0 | 6.0 | 0.0 | 100.0 | 60 | 520 | 900 |

TABLE 1-(3)-continued

| | Composition (% by mass) | | | | | | | | | | | Properties | | |
|---|---|---|---|---|---|---|---|---|---|---|---|---|---|---|
| Examples | $SiO_2$ | $Al_2O_3$ | $B_2O_3$ | $Na_2O$ | $K_2O$ | MgO | BaO | $ZrO_2$ | ZnO | $Gd_2O_3$ | total | Thermal expansion coefficient ($\times 10^{-7}/°C$) | Glass transition temperature (°C) | Calcination temperature (°C) |
| 57 | 31.5 | 10.8 | 24.3 | 4.5 | 0.0 | 0.0 | 13.5 | 0.0 | 5.4 | 10.0 | 100.0 | 65 | 540 | 960 |
| 58 | 28.0 | 9.6 | 21.6 | 4.0 | 0.0 | 0.0 | 12.0 | 0.0 | 4.8 | 20.0 | 100.0 | 70 | 560 | 1020 |
| 59 | 26.3 | 9.0 | 20.3 | 3.8 | 0.0 | 0.0 | 11.3 | 0.0 | 4.5 | 25.0 | 100.0 | 72.5 | 570 | 1050 |
| 60 | 24.5 | 8.4 | 18.9 | 3.5 | 0.0 | 0.0 | 10.5 | 0.0 | 4.2 | 30.0 | 100.0 | 75 | 580 | 1080 |
| 61 | 22.8 | 7.8 | 17.6 | 3.3 | 0.0 | 0.0 | 9.8 | 0.0 | 3.9 | 35.0 | 100.0 | 77.5 | 590 | 1110 |

Table 2-(1), -(2) and -(3) give Examples for the PbO-containing glass compositions. The PbO content was varied in Examples 62 to 74, $SiO_2$ content was varied in Examples 75 to 83, $Al_2O_3$ content was varied in Examples 84 to 91, $B_2O_3$ content was varied in Examples 92 to 97, $K_2O$ content was varied in Examples 98 to 103, BaO content was varied in Examples 104 to 109, $ZrO_2$ content was varied in Examples 110 to 113, ZnO content was varied in Examples 114 to 117, and $Gd_2O_3$ content was varied in Examples 118 to 122.

As shown, the glass composition has a glass transition temperature higher than 450° C., can be calcined at 1100° C. or lower to form the protective coat, and thermal expansion coefficient of 50 to $80 \times 10^{-7}/°C$., when it contains PbO at 20 to 70%, $SiO_2$ at 10 to 40%, $Al_2O_3$ at 30% or less, $B_2O_3$ at 20% or less, an alkali metal oxide at 20% or less, alkaline earth metal oxide at 20% or less, $ZrO_2$ at 10% or less, ZnO at 10% or less and rare-earth oxide at 30% or less, all percentages by mass.

TABLE 2-(1)

| | Composition (% by mass) | | | | | | | | | | | Properties | | |
|---|---|---|---|---|---|---|---|---|---|---|---|---|---|---|
| Examples | PbO | $SiO_2$ | $Al_2O_3$ | $B_2O_3$ | $K_2O$ | MgO | BaO | $ZrO_2$ | ZnO | $Gd_2O_3$ | total | Thermal expansion coefficient ($\times 10^{-7}/°C$) | Glass transition temperature (°C) | Calcination temperature (°C) |
| 62 | 10.0 | 46.0 | 10.0 | 16.0 | 0.0 | 0.0 | 0.0 | 0.0 | 0.0 | 18.0 | 100.0 | 53 | 635 | 1060 |
| 63 | 15.0 | 43.4 | 9.4 | 15.1 | 0.0 | 0.0 | 0.0 | 0.0 | 0.0 | 17.0 | 100.0 | 54 | 620 | 1030 |
| 64 | 20.0 | 40.9 | 8.9 | 14.2 | 0.0 | 0.0 | 0.0 | 0.0 | 0.0 | 16.0 | 100.0 | 55 | 605 | 1000 |
| 65 | 25.0 | 38.3 | 8.3 | 13.3 | 0.0 | 0.0 | 0.0 | 0.0 | 0.0 | 15.0 | 100.0 | 56 | 590 | 970 |
| 66 | 30.0 | 35.8 | 7.8 | 12.4 | 0.0 | 0.0 | 0.0 | 0.0 | 0.0 | 14.0 | 100.0 | 57 | 575 | 940 |
| 67 | 40.0 | 30.7 | 6.7 | 10.7 | 0.0 | 0.0 | 0.0 | 0.0 | 0.0 | 12.0 | 100.0 | 59 | 545 | 880 |
| 68 | 45.0 | 28.1 | 6.1 | 9.8 | 0.0 | 0.0 | 0.0 | 0.0 | 0.0 | 11.0 | 100.0 | 60 | 530 | 850 |
| 69 | 50.0 | 25.6 | 5.6 | 8.9 | 0.0 | 0.0 | 0.0 | 0.0 | 0.0 | 10.0 | 100.0 | 61 | 515 | 820 |
| 70 | 55.0 | 23.0 | 5.0 | 8.0 | 0.0 | 0.0 | 0.0 | 0.0 | 0.0 | 9.0 | 100.0 | 62 | 500 | 790 |
| 71 | 60.0 | 20.4 | 4.4 | 7.1 | 0.0 | 0.0 | 0.0 | 0.0 | 0.0 | 8.0 | 100.0 | 63 | 485 | 760 |
| 72 | 65.0 | 17.9 | 3.9 | 6.2 | 0.0 | 0.0 | 0.0 | 0.0 | 0.0 | 7.0 | 100.0 | 64 | 470 | 730 |
| 73 | 70.0 | 15.3 | 3.3 | 5.3 | 0.0 | 0.0 | 0.0 | 0.0 | 0.0 | 6.0 | 100.0 | 65 | 455 | 700 |
| 74 | 75.0 | 12.8 | 2.8 | 4.4 | 0.0 | 0.0 | 0.0 | 0.0 | 0.0 | 5.0 | 100.0 | 66 | 440 | 670 |
| 75 | 63.3 | 5.0 | 12.7 | 10.1 | 0.0 | 2.5 | 0.0 | 0.0 | 0.0 | 6.3 | 100.0 | 85 | 430 | 790 |
| 76 | 60.0 | 10.0 | 12.0 | 9.6 | 0.0 | 2.4 | 0.0 | 0.0 | 0.0 | 6.0 | 100.0 | 80 | 450 | 805 |
| 77 | 56.7 | 15.0 | 11.3 | 9.1 | 0.0 | 2.3 | 0.0 | 0.0 | 0.0 | 5.7 | 100.0 | 75 | 470 | 820 |
| 78 | 53.3 | 20.0 | 10.7 | 8.5 | 0.0 | 2.1 | 0.0 | 0.0 | 0.0 | 5.3 | 100.0 | 70 | 490 | 835 |
| 79 | 50.0 | 25.0 | 10.0 | 8.0 | 0.0 | 2.0 | 0.0 | 0.0 | 0.0 | 5.0 | 100.0 | 65 | 510 | 850 |
| 80 | 46.7 | 30.0 | 9.3 | 7.5 | 0.0 | 1.9 | 0.0 | 0.0 | 0.0 | 4.7 | 100.0 | 60 | 530 | 865 |
| 81 | 43.3 | 35.0 | 8.7 | 6.9 | 0.0 | 1.7 | 0.0 | 0.0 | 0.0 | 4.3 | 100.0 | 55 | 550 | 880 |
| 82 | 40.0 | 40.0 | 8.0 | 6.4 | 0.0 | 1.6 | 0.0 | 0.0 | 0.0 | 4.0 | 100.0 | 50 | 570 | 895 |

TABLE 2-(2)

| | Composition (% by mass) | | | | | | | | | | | Properties | | |
|---|---|---|---|---|---|---|---|---|---|---|---|---|---|---|
| Examples | PbO | $SiO_2$ | $Al_2O_3$ | $B_2O_3$ | $K_2O$ | MgO | BaO | $ZrO_2$ | ZnO | $Gd_2O_3$ | total | Thermal expansion coefficient ($\times 10^{-7}/°C$) | Glass transition temperature (°C) | Calcination temperature (°C) |
| 83 | 36.7 | 45.0 | 7.3 | 5.9 | 0.0 | 1.5 | 0.0 | 0.0 | 0.0 | 3.7 | 100.0 | 45 | 590 | 910 |
| 84 | 53.7 | 28.4 | 0.0 | 7.4 | 0.0 | 0.0 | 0.0 | 0.0 | 0.0 | 10.5 | 100.0 | 64 | 500 | 825 |
| 85 | 51.0 | 27.0 | 5.0 | 7.0 | 0.0 | 0.0 | 0.0 | 0.0 | 0.0 | 10.0 | 100.0 | 63 | 525 | 850 |
| 86 | 48.3 | 25.6 | 10.0 | 6.6 | 0.0 | 0.0 | 0.0 | 0.0 | 0.0 | 9.5 | 100.0 | 62 | 550 | 880 |
| 87 | 45.6 | 24.2 | 15.0 | 6.3 | 0.0 | 0.0 | 0.0 | 0.0 | 0.0 | 8.9 | 100.0 | 61 | 575 | 910 |

TABLE 2-(2)-continued

| | Composition (% by mass) | | | | | | | | | | Properties | | |
|---|---|---|---|---|---|---|---|---|---|---|---|---|---|
| | | | | | | | | | | | Thermal expansion coefficient | Glass transition temperature | Calcination temperature |
| Examples | PbO | $SiO_2$ | $Al_2O_3$ | $B_2O_3$ | $K_2O$ | MgO | BaO | $ZrO_2$ | ZnO | $Gd_2O_3$ | total | (x $10^{-7}$/°C.) | (°C.) | (°C.) |
| 88 | 42.9 | 22.7 | 20.0 | 5.9 | 0.0 | 0.0 | 0.0 | 0.0 | 0.0 | 8.4 | 100.0 | 60 | 600 | 940 |
| 89 | 40.3 | 21.3 | 25.0 | 5.5 | 0.0 | 0.0 | 0.0 | 0.0 | 0.0 | 7.9 | 100.0 | 59 | 625 | 970 |
| 90 | 37.6 | 19.9 | 30.0 | 5.2 | 0.0 | 0.0 | 0.0 | 0.0 | 0.0 | 7.4 | 100.0 | 58 | 650 | 1000 |
| 91 | 34.9 | 18.5 | 35.0 | 4.8 | 0.0 | 0.0 | 0.0 | 0.0 | 0.0 | 6.8 | 100.0 | 57 | 675 | 1030 |
| 92 | 58.9 | 25.6 | 5.6 | 0.0 | 5.6 | 0.0 | 0.0 | 0.0 | 0.0 | 4.4 | 100.0 | 68 | 530 | 800 |
| 93 | 55.9 | 24.3 | 5.3 | 5.0 | 5.3 | 0.0 | 0.0 | 0.0 | 0.0 | 4.2 | 100.0 | 67 | 510 | 800 |
| 94 | 53.0 | 23.0 | 5.0 | 10.0 | 5.0 | 0.0 | 0.0 | 0.0 | 0.0 | 4.0 | 100.0 | 66 | 490 | 800 |
| 95 | 50.1 | 21.7 | 4.7 | 15.0 | 4.7 | 0.0 | 0.0 | 0.0 | 0.0 | 3.8 | 100.0 | 65 | 470 | 800 |
| 96 | 47.1 | 20.4 | 4.4 | 20.0 | 4.4 | 0.0 | 0.0 | 0.0 | 0.0 | 3.6 | 100.0 | 64 | 450 | 800 |
| 97 | 44.2 | 19.2 | 4.2 | 25.0 | 4.2 | 0.0 | 0.0 | 0.0 | 0.0 | 3.3 | 100.0 | 63 | 430 | 800 |
| 98 | 55.0 | 25.0 | 5.0 | 10.0 | 0.0 | 0.0 | 0.0 | 0.0 | 0.0 | 5.0 | 100.0 | 60 | 495 | 800 |
| 99 | 52.3 | 23.8 | 4.8 | 9.5 | 5.0 | 0.0 | 0.0 | 0.0 | 0.0 | 4.8 | 100.0 | 61 | 485 | 800 |
| 100 | 49.5 | 22.5 | 4.5 | 9.0 | 10.0 | 0.0 | 0.0 | 0.0 | 0.0 | 4.5 | 100.0 | 62 | 475 | 800 |
| 101 | 46.8 | 21.3 | 4.3 | 8.5 | 15.0 | 0.0 | 0.0 | 0.0 | 0.0 | 4.3 | 100.0 | 63 | 465 | 800 |
| 102 | 44.0 | 20.0 | 4.0 | 8.0 | 20.0 | 0.0 | 0.0 | 0.0 | 0.0 | 4.0 | 100.0 | 64 | 455 | 800 |
| 103 | 41.3 | 18.8 | 3.8 | 7.5 | 25.0 | 0.0 | 0.0 | 0.0 | 0.0 | 3.8 | 100.0 | 65 | 445 | 800 |

TABLE 2-(3)

| | Composition (% by mass) | | | | | | | | | | | Properties | | |
|---|---|---|---|---|---|---|---|---|---|---|---|---|---|---|
| | | | | | | | | | | | | Thermal expansion coefficient | Glass transition temperature | Calcination temperature |
| Examples | PbO | $SiO_2$ | $Al_2O_3$ | $B_2O_3$ | $K_2O$ | MgO | BaO | $ZrO_2$ | ZnO | $Gd_2O_3$ | total | (x $10^{-7}$/°C.) | (°C.) | (°C.) |
| 104 | 55.0 | 27.0 | 5.0 | 8.0 | 0.0 | 0.0 | 0.0 | 0.0 | 0.0 | 5.0 | 100.0 | 62 | 490 | 800 |
| 105 | 52.3 | 25.7 | 4.8 | 7.6 | 0.0 | 0.0 | 5.0 | 0.0 | 0.0 | 4.8 | 100.0 | 63 | 480 | 800 |
| 106 | 49.5 | 24.3 | 4.5 | 7.2 | 0.0 | 0.0 | 10.0 | 0.0 | 0.0 | 4.5 | 100.0 | 64 | 470 | 800 |
| 107 | 46.8 | 23.0 | 4.3 | 6.8 | 0.0 | 0.0 | 15.0 | 0.0 | 0.0 | 4.3 | 100.0 | 65 | 460 | 800 |
| 108 | 44.0 | 21.6 | 4.0 | 6.4 | 0.0 | 0.0 | 20.0 | 0.0 | 0.0 | 4.0 | 100.0 | 66 | 450 | 800 |
| 109 | 41.3 | 20.3 | 3.8 | 6.0 | 0.0 | 0.0 | 25.0 | 0.0 | 0.0 | 3.8 | 100.0 | 67 | 440 | 800 |
| 110 | 58.0 | 23.0 | 5.0 | 10.0 | 0.0 | 0.0 | 0.0 | 0.0 | 0.0 | 4.0 | 100.0 | 60 | 490 | 800 |
| 111 | 55.1 | 21.9 | 4.8 | 9.5 | 0.0 | 0.0 | 0.0 | 5.0 | 0.0 | 3.8 | 100.0 | 56 | 495 | 800 |
| 112 | 52.2 | 20.7 | 4.5 | 9.0 | 0.0 | 0.0 | 0.0 | 10.0 | 0.0 | 3.6 | 100.0 | 52 | 500 | 800 |
| 113 | 49.3 | 19.6 | 4.3 | 8.5 | 0.0 | 0.0 | 0.0 | 15.0 | 0.0 | 3.4 | 100.0 | 48 | 505 | 800 |
| 114 | 55.0 | 25.0 | 4.0 | 9.0 | 0.0 | 0.0 | 0.0 | 0.0 | 0.0 | 7.0 | 100.0 | 60 | 500 | 800 |
| 115 | 52.3 | 23.8 | 3.8 | 8.6 | 0.0 | 0.0 | 0.0 | 0.0 | 5.0 | 6.7 | 100.0 | 55 | 505 | 800 |
| 116 | 49.5 | 22.5 | 3.6 | 8.1 | 0.0 | 0.0 | 0.0 | 0.0 | 10.0 | 6.3 | 100.0 | 50 | 510 | 800 |
| 117 | 46.8 | 21.3 | 3.4 | 7.7 | 0.0 | 0.0 | 0.0 | 0.0 | 15.0 | 6.0 | 100.0 | 45 | 515 | 800 |
| 118 | 52.6 | 26.3 | 10.5 | 10.5 | 0.0 | 0.0 | 0.0 | 0.0 | 0.0 | 0.0 | 100.0 | 60 | 500 | 760 |
| 119 | 50.0 | 25.0 | 10.0 | 10.0 | 0.0 | 0.0 | 0.0 | 0.0 | 0.0 | 5.0 | 100.0 | 63 | 505 | 800 |
| 120 | 47.4 | 23.7 | 9.5 | 9.5 | 0.0 | 0.0 | 0.0 | 0.0 | 0.0 | 10.0 | 100.0 | 66 | 510 | 840 |
| 121 | 42.1 | 21.1 | 8.4 | 8.4 | 0.0 | 0.0 | 0.0 | 0.0 | 0.0 | 20.0 | 100.0 | 72 | 520 | 920 |
| 120 | 39.5 | 19.7 | 7.9 | 7.9 | 0.0 | 0.0 | 0.0 | 0.0 | 0.0 | 25.0 | 100.0 | 75 | 525 | 960 |
| 121 | 36.8 | 18.4 | 7.4 | 7.4 | 0.0 | 0.0 | 0.0 | 0.0 | 0.0 | 30.0 | 100.0 | 78 | 530 | 1000 |
| 122 | 34.2 | 17.1 | 6.8 | 6.8 | 0.0 | 0.0 | 0.0 | 0.0 | 0.0 | 35.0 | 100.0 | 81 | 535 | 1040 |

EMBODIMENT 2

The EGR system which adopts the gas flow meter of the present invention is described. A conventional technique indirectly controls EGR rate by estimating the rate based on intake-side information, e.g., air flow sensor 11 or throttle 12 opening. By contrast, the EGR system of the present invention adopts the gas flow meter 7 of the present invention between the EGR cooler 15 and EGR valve 14, as illustrated in FIG. 4, to measure EGR rate thereby controlling the rate. This system can abate NOx and PM emissions to 1/10 or less and 1/50 or less, respectively, of those associated with a conventional system under similar conditions and operational mode.

A conventional element and the element for the present invention were electrically heated to prevent deposition of PM present in exhaust gases thereon in the gas flow meter 7.

PM was deposited on a conventional element heated to 300° C. to temporarily deteriorate measurement sensitivity, eventually disabling the measurement. It was damaged by cracking of the protective coat, when heated to 350° C., to disable the measurement, although PM deposition was prevented.

By contrast, the element for the present invention, when heated to 350° C., showed neither PM deposited thereon nor deteriorated properties.

Figure 5:
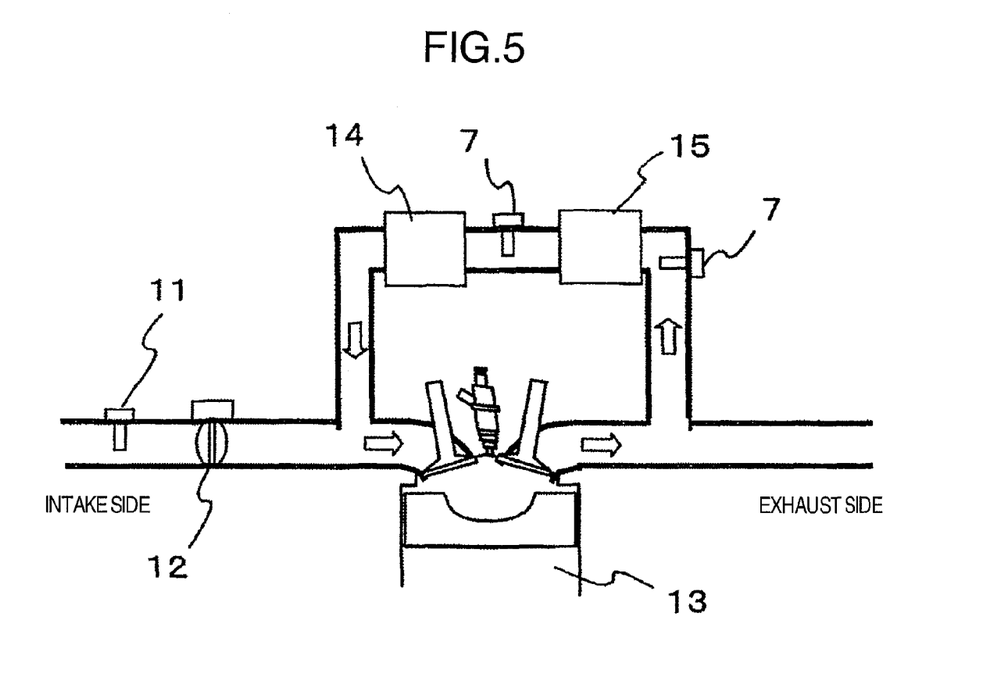
FIG. 5 illustrates a structure of another EGR system.

The EGR cooler 15 is provided to cool exhaust gases. When it is clogged with PM present in exhaust gases, EGR gases are no longer stably supplied to the internal combustion engine 13. Extent of the clogging can be determined by measuring flow rate by the gas flow meters 7 provided both in the upstream and downstream of the EGR cooler, as illustrated in FIG. 5.

Figure 6:
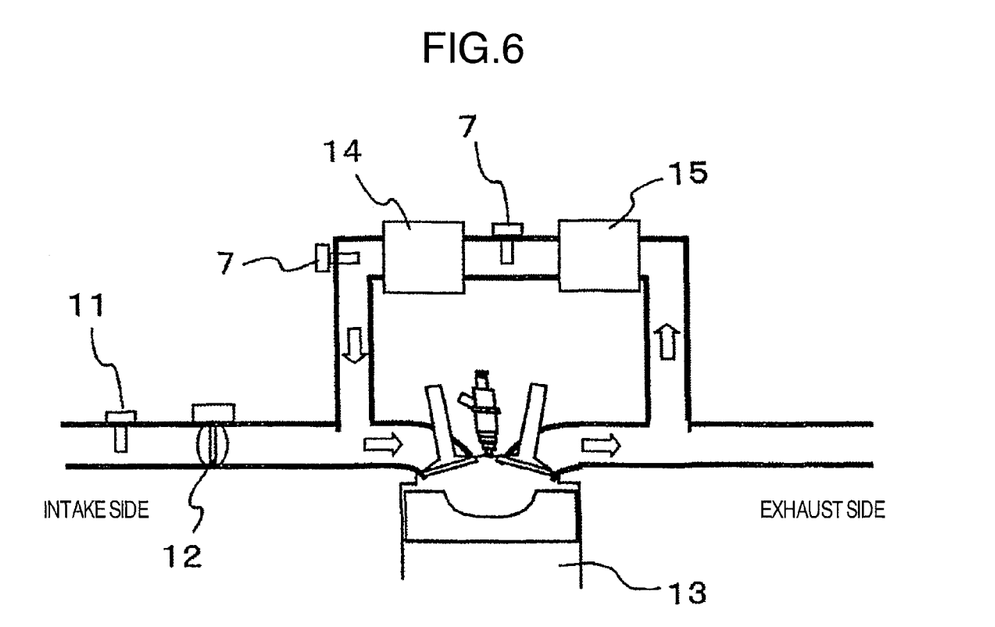
FIG. 6 illustrates a structure of still another EGR system.

The EGR valve 14 is provided to EGR rate of exhaust gases to be supplied to the internal combustion engine 13. PM in the exhaust gases, when deposited on the valve 14, deteriorates supply rate measurement accuracy. Extent of PM deposition can be determined by measuring flow rate by the gas flow meters 7 provided both in the upstream and downstream of the valve, when flow rate information is coupled with valve opening information, as illustrated in FIG. 6.

As discussed above, the present invention is effective for accurate measurement for an EGR system.

It should be further understood by those skilled in the art that although the foregoing description has been made on embodiments of the invention, the invention is not limited thereto and various changes and modifications may be made without departing from the spirit of the invention and the scope of the appended claims.

ADVANTAGES OF THE INVENTION

The present invention can accurately control EGR rate.

The invention claimed is:

1. A gas flow meter for determining a gas mass flow rate comprising:
    a heat resistor element configured to be placed in a stream of gases to be measured, wherein the gas mass flow rate is determined based on a current value passing through the heat resistor element; and
    the heat resistor element comprises an electrically insulating substrate made of alumina; a heating section which is composed of a protective coat composed of a glass and a metallic resistor element formed on the substrate; a lead portion electrically connected to the heating section at each end;
    a fixing member which electrically connects the lead portion to an external circuit,
    wherein the heat resistor element is controlled at a heating temperature of 350°C. or higher.

2. A gas flow meter for measuring an amount of exhaust gases recycled of an internal combustion engine for vehicles, comprising a heat resistor element placed in a stream of gases to be measured,
    wherein the heat resistor element comprises: an electrically insulating substrate; a heating section which is composed of a protective coat composed of a glass and a metallic resistor element formed on the substrate; a lead portion electrically connected to the heating section; and a fixing member which electrically connects the lead portion to an external circuit, and
    wherein the protective coat is composed of a glass having a composition containing $SiO_2$ at 10 to 70% (as oxide) and at least oxides selected from the group consisting of $B_2O_3$, $Al_2O_3$, an alkali metal oxide, alkaline earth oxide, $ZrO_2$, ZnO and rare earth oxide at 30% or less $Al_2O_3$, 50% or less $B_2O_3$, 40% or less alkali metal oxide, 40% or less alkaline earth oxide, 20% or less $ZrO_2$, 40% or less ZnO and 30% or less rare-earth oxide, all percentages by mass.

3. A gas flow meter for measuring an amount of exhaust gases recycled of an internal combustion engine for vehicles, comprising a heat resistor element placed in a stream of gases to be measured,
    wherein the heat resistor element comprises: an electrically insulating substrate; a heating section which is composed of a protective coat composed of a glass and a metallic resistor element formed on the substrate; a lead portion electrically connected to the heating section; and a fixing member which electrically connects the lead portion to an external circuit, and
    wherein the protective coat is composed of a glass containing PbO at 20 to 70% (as oxide), $SiO_2$ at 10 to 40%, and at least oxides selected from the group consisting of $Al_2O_3$, $B_2O_3$, an alkali metal oxide, alkaline earth oxide, $ZrO_2$, ZnO and rare earth oxide at 30% or less $Al_2O_3$, 20% or less $B_2O_3$, 20% or less alkali metal oxide, 20% or less alkaline earth oxide, 10% or less $ZrO_2$, 10% or less ZnO, and 30% or less rare-earth oxide, all percentages by mass.

4. The gas flow meter according to claim 2, wherein the protective coat has a glass transition temperature higher than 450 °C. and thermal expansion coefficient of from $50 \times 10^{-7}$ to $80 \times 10^{-7}$/°C.

5. The gas flow meter according to claim 2, wherein the glass of the protective coat has a glass transition temperature higher than 450°C.

6. The gas flow meter according to claim 2, wherein the glass of the protective coat has a thermal expansion coefficient of from $50 \times 10^{-7}$ to $80 \times 10^{-7}$/°C.

7. An exhaust gas recirculation system which recycles part of exhaust gases back to an intake stream and which adopts the gas flow meter according to claim 2 in a pipe in which the gases are recycled from an exhaust side to an intake side.

8. The exhaust gas recirculation system according to claim 7 comprising a control valve for controlling flow rate of the exhaust gases recycled back to the intake side on the basis of the flow rate measured by the flow meter.

9. The exhaust gas recirculation system according to claim 7 comprising a cooler for cooling the recycled exhaust gases in the pipe, wherein the gas flow meters are provided both in the upstream and downstream of the cooler.

* * * * *